United States Patent
Yao et al.

(10) Patent No.: US 6,909,262 B2
(45) Date of Patent: Jun. 21, 2005

(54) CONTROL SYSTEM FOR REGULATING EXCITER POWER FOR A BRUSHLESS SYNCHRONOUS GENERATOR

(75) Inventors: Yuan Yao, Mississauga (CA); Borka Vlacic, Georgetown (CA); Mong-Hang Li, Thornhill (CA); Manuel Ha, Etobicoke (CA)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/157,356

(22) Filed: May 29, 2002

(65) Prior Publication Data

US 2003/0085691 A1 May 8, 2003

Related U.S. Application Data

(60) Provisional application No. 60/335,340, filed on Nov. 2, 2001.

(51) Int. Cl.$^7$ ............................ H02H 7/06; H02P 11/00; H02P 9/00; H02P 9/14
(52) U.S. Cl. ............................. 322/28; 322/46; 322/22
(58) Field of Search ........................... 322/22, 24, 25, 322/26, 28, 46, 58

(56) References Cited

U.S. PATENT DOCUMENTS

| | | | |
|---|---|---|---|
| 4,131,938 A | * 12/1978 | Milberger et al. | 363/101 |
| 4,340,849 A | * 7/1982 | Kuhn | 322/28 |
| 4,736,284 A | * 4/1988 | Yamagishi et al. | 363/16 |
| 4,868,406 A | 9/1989 | Glennon et al. | 240/4 R |
| 4,939,441 A | 7/1990 | Dhyanchand | 322/58 |
| 4,956,598 A | 9/1990 | Recker et al. | 206/459 |
| 5,027,265 A | 6/1991 | Dhyanchand et al. | 363/37 |
| 5,038,095 A | 8/1991 | Kirchberg et al. | 363/98 |
| 5,055,700 A | 10/1991 | Dhyanchand | 363/41 |
| 5,055,992 A | 10/1991 | Cook | 363/71 |

(Continued)

FOREIGN PATENT DOCUMENTS

| | | |
|---|---|---|
| EP | 1 130 765 A2 | 9/2001 |
| GB | 2 293 704 A | 4/1996 |

OTHER PUBLICATIONS

Rudolf F. Grap, Modern Dictionary of Electronics, Butterworht–Heinemann, Seventh Edition, 1999, pp 837.*

*Primary Examiner*—Darren Schuberg
*Assistant Examiner*—Julio C. Gonzalez
(74) *Attorney, Agent, or Firm*—Larry J. Palguta

(57) ABSTRACT

A control system regulates power to a brushless synchronous generator (BSG) (204) having a permanent magnetic generator (PMG)(210), an exciter (208) and a main generator (206) connected to a rotating shaft (212). The generator control unit (GCU) (202) includes a three phase rectifier (214), a PMG voltage regulator (222), a generator control relay (GCR)(220), a GCU power supply (216) with a backup power source (217), a field switch driver (218), a field switch (219), and a free wheeling diode (221). The BSG (204) is connected to the GCU (202) by coupling the PMG (210) of the BSG (204) to the three phase rectifier (214) of the GCU (202) and by coupling the exciter (208) of the BSG (204) to the PMG voltage regulator (222) and the field switch driver (218) of the GCU (202) and the PMG voltage regulator (222) regulates the voltage of the PMG (210).

15 Claims, 3 Drawing Sheets

U.S. PATENT DOCUMENTS

| | | | | |
|---|---|---|---|---|
| 5,068,590 A | | 11/1991 | Glennon et al. | 318/716 |
| 5,111,376 A | | 5/1992 | Mehl | 322/14 |
| 5,225,973 A | * | 7/1993 | Patel et al. | 363/43 |
| 5,430,362 A | | 7/1995 | Carr et al. | 290/39 |
| 5,434,771 A | | 7/1995 | Danby et al. | 363/37 |
| 5,444,349 A | | 8/1995 | Rozman et al. | 322/10 |
| 5,488,286 A | | 1/1996 | Rozman et al. | 322/28 |
| 5,493,200 A | | 2/1996 | Rozman et al. | 318/779 |
| 5,495,162 A | | 2/1996 | Rozman et al. | 322/10 |
| 5,495,163 A | | 2/1996 | Rozman et al. | 318/723 |
| 5,581,168 A | * | 12/1996 | Rozman et al. | 318/723 |
| 5,583,753 A | * | 12/1996 | Takayama | 363/71 |
| 5,587,647 A | * | 12/1996 | Bansal et al. | 322/45 |
| 5,594,322 A | | 1/1997 | Rozman et al. | 363/41 |
| 5,600,548 A | | 2/1997 | Nguyen et al. | 363/37 |
| 5,610,452 A | * | 3/1997 | Shimer et al. | 307/89 |
| 5,657,214 A | | 8/1997 | Nguyen et al. | 363/98 |
| 5,689,175 A | * | 11/1997 | Hanson et al. | 322/28 |
| 5,805,394 A | * | 9/1998 | Glennon | 361/20 |
| 5,805,439 A | * | 9/1998 | Kruppa | 363/142 |
| 5,822,200 A | * | 10/1998 | Stasz | 363/21.18 |
| 5,850,138 A | * | 12/1998 | Adams et al. | 322/68 |
| 5,955,809 A | | 9/1999 | Shah | 310/198 |
| 6,486,640 B2 | * | 11/2002 | Adams | 322/59 |
| 6,577,516 B1 | * | 6/2003 | Thoren et al. | 363/84 |
| 2001/0033506 A1 | * | 10/2001 | Farrington et al. | 363/127 |

* cited by examiner

CONTROL SYSTEM FOR REGULATING EXCITER POWER FOR A BRUSHLESS SYNCHRONOUS GENERATOR

RELATED APPLICATION

This application claims priority under 35 U.S.C. §119(e) of U.S. Provisional Application No. 60/335,340 filed on Nov. 2, 2001, the entire contents of which are herein incorporated by reference.

FIELD OF THE INVENTION

The present invention relates to a control system for regulating exciter power for a brushless synchronous generator.

BACKGROUND OF THE INVENTION

In many aircraft and other airborne systems, AC power is generated from a brushless synchronous generator. FIG. 1 illustrates a conventional configuration of a brushless synchronous generator excitation power arrangement connected to a generator control unit.

A brushless synchronous generator 104 will typically include three types of alternating current (AC) synchronous generators: a main generator 106; an exciter 108; and a permanent magnetic generator (PMG) 110 connected to the same rotating shaft 112. The exciter 108 is used to achieve brushless excitation and the PMG 110 is the power source providing power to the exciter 108 and a generator control unit (GCU) 102.

As shown in FIG. 1, the GCU 102 contains a three phase rectifier 114, a generator control relay 120, a power supply 116, a field switch 119 and a field switch driver 118. The power supply 116 is provided with backup power 123. A free wheeling diode 117 is connected between line 113 and line 115. Line 113 connects an output line of the three phase rectifier 114 with one end of the stator winding of the exciter 108. Line 115 connects the field switch 119 to the other end of the stator winding of the exciter 108. The three phase rectifier 114 is electrically coupled to the PMG 112 and the exciter 108.

In FIG. 1, the PMG power is input to the GCU 102. In the GCU 112, the three-phase PMG AC power is scaled and rectified in the three phase rectifier 114. When the field switch 119 is ON, the free wheeling diode 117 is reverse biased and is in a blocking state. When the field switch 119 is OFF, the free wheeling diode is forced on and the diode creates a free-wheeling path for excitation energy from the exciter 108 stator coil. The rectified PMG power is fed to the exciter stator coil to excite the generator. Since the exciter power is only rectified before being input to the exciter 108, its voltage level varies with generator speed. When the generator control relay 120 closes, a connection from the three-phase rectifier 114 is made and exciter power flows to a coil of the exciter 108.

In an AC generator, the generated voltage varies with the rotating speed of the generator. In constant frequency electric power systems where the generator speed is almost fixed, the output voltage from the PMG changes very little. Therefore, after applying rectification and scaling, the PMG power can be controlled to energize the exciter.

However, in recent years, variable frequency (VF) power systems have gained in popularity and applications. In a VF power system, the non-constant PMG voltage can cause problems. In a VF power system, the speed of the generator varies with the engine speed, thereby causing the PMG output voltage to randomly change or vary over a wide range.

In a conventional configuration, the supply voltage to the exciter will vary in the same manner as the generator speed varies. A generator exciter requires higher field or excitation currents when the generator speed is low or the load on the generator is high. Conversely, a generator exciter requires lower field or excitation currents when the generator speed is high or its load is low. Because the PMG voltage is proportional to the generator speed, a high exciter power supply voltage can cause control difficulty. For example, the generator may not work properly or at all under certain operating conditions, such as high-end speed and light load condition.

Therefore, it is desirable to have regulated exciter power for a brushless synchronous generator that solves the aforementioned problems.

SUMMARY OF THE INVENTION

In accordance with the present invention, the deficiencies in prior systems are overcome by providing an improved control system for regulating exciter power for a brushless synchronous generator.

A control system includes a brushless synchronous generator (BSG) having a permanent magnetic generator (PMG), an exciter and a main generator that are connected to a rotating shaft. A generator control unit (GCU) modulates a generator excitation source voltage according to load and speed conditions, to maintain a constant output voltage at the point-of-regulation (POR). A rectifier converts alternating current to direct current. The rectifier can be a three phase rectifier. A voltage regulator controls an output voltage level based upon the power requirement of the exciter. A field switch maintains a field current through an exciter stator winding under load and speed conditions. A free wheeling diode modifies exciter power in reference to a field current component controlled by the field switch.

The BSG is connected to the GCU by coupling the PMG of the BSG to the three phase rectifier of the GCU and by coupling the exciter of the BSG to a PMG voltage regulator. The PMG voltage regulator regulates the DC voltage converted from the PMG.

The PMG voltage regulator further includes a direct current (DC) to direct current (DC) converter. In one implementation, a variable DC voltage is input into the DC to DC converter, a current signal from a constant DC voltage output line is output from the DC to DC converter and fed back through a current conditioning circuit and then input into the DC to DC converter for short circuit protection. The voltage signal from the constant DC voltage output line is also output from the DC to DC converter and fed back through a voltage feedback circuit and then input into the DC to DC converter. This feedback of the voltage signal in conjunction with the input from the voltage reference helps maintain a stable output from the DC/DC converter.

An output voltage level of the PMG voltage regulator is based on the power requirement of the generator exciter. The PMG voltage regulator receives a rectified PMG voltage as input, and in one implementation, performs voltage regulation using a switching-mode step-down DC/DC converter. The rectified PMG voltage is regulated with the DC/DC converter and the DC power applied to the exciter is independent of the generator speed. The DC power applied to the exciter is a constant voltage source and is independent of the generator speed.

The present invention offers numerous advantages over the conventional design. First, the generator exciter power supply is constant over the entire speed range. This will eliminate the out of regulation problem due to the too narrow duty-cycle of the generator at high speed and light load conditions. The generator voltage regulator maintains the POR voltage by modulating the DC input power of the exciter, i.e. by varying duty-cycle of the field switch. The modulation duty-cycle of the field switch varies with one of the following factors: (1) load on the generator: the less the load on the generator, the lower the duty-cycle required; (2) the generator speed: a generator operating at a higher speed requires less excitation current or a lower duty-cycle; and (3) the power supply voltage level. The modulation duty-cycle is inversely proportional to the power supply voltage level. At high speed the PMG produces a high output voltage. Therefore, to keep the excitation current at the level needed, the duty-cycle has to be reduced.

As described above, the modulation duty-cycle decreases as the load on the generator is reduced or the generator speed increases. The generator becomes uncontrollable once the duty-cycle is too low (near zero), causing instability whether the field switch switches at fixed or non-fixed frequency. Secondly, because the exciter power supply voltage is constant, the control design of the generator voltage regulator is easier. Thirdly, in the case when a voltage will rise less dramatically because the exciter power supply voltage is not very high, the containment and management of an overvoltage condition is facilitated. Also, the present invention makes it easier to convert a 28 Vdc for the GCU internal power supply because the input voltage is held constant.

BRIEF DESCRIPTION OF THE DRAWINGS

A more complete understanding of the present invention will become apparent from the following description taken in conjunction with the accompanying drawings, wherein.

DETAILED DESCRIPTION OF THE PREFERRED EMBODIMENTS

Aspects of the invention are disclosed in the accompanying description. Alternate embodiments may be devised without departing from the spirit or the scope of the invention.

Figure 1:
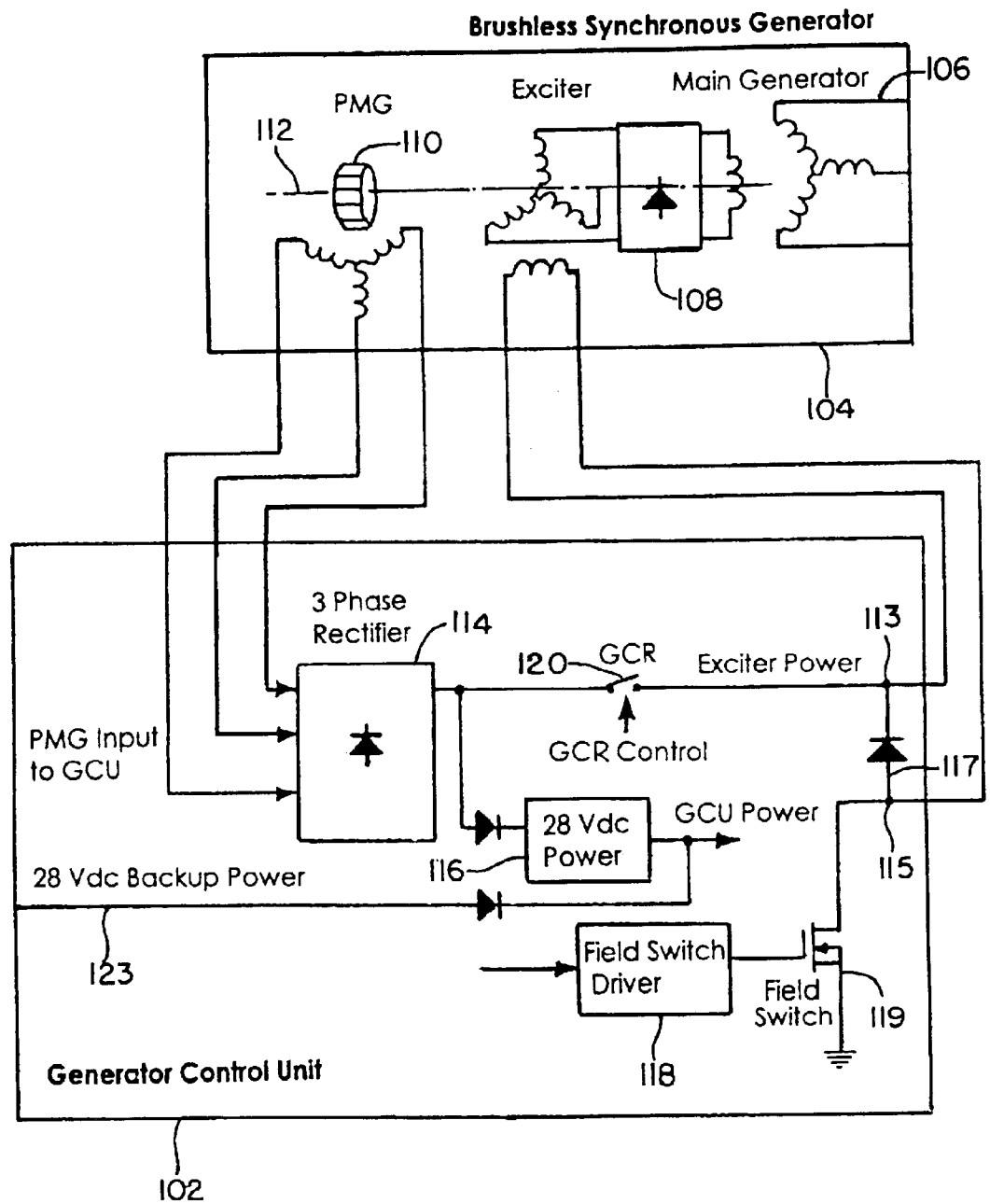
FIG. 1 is a schematic illustration of a conventional configuration of a brushless synchronous generator excitation power arrangement.
Figure 2:
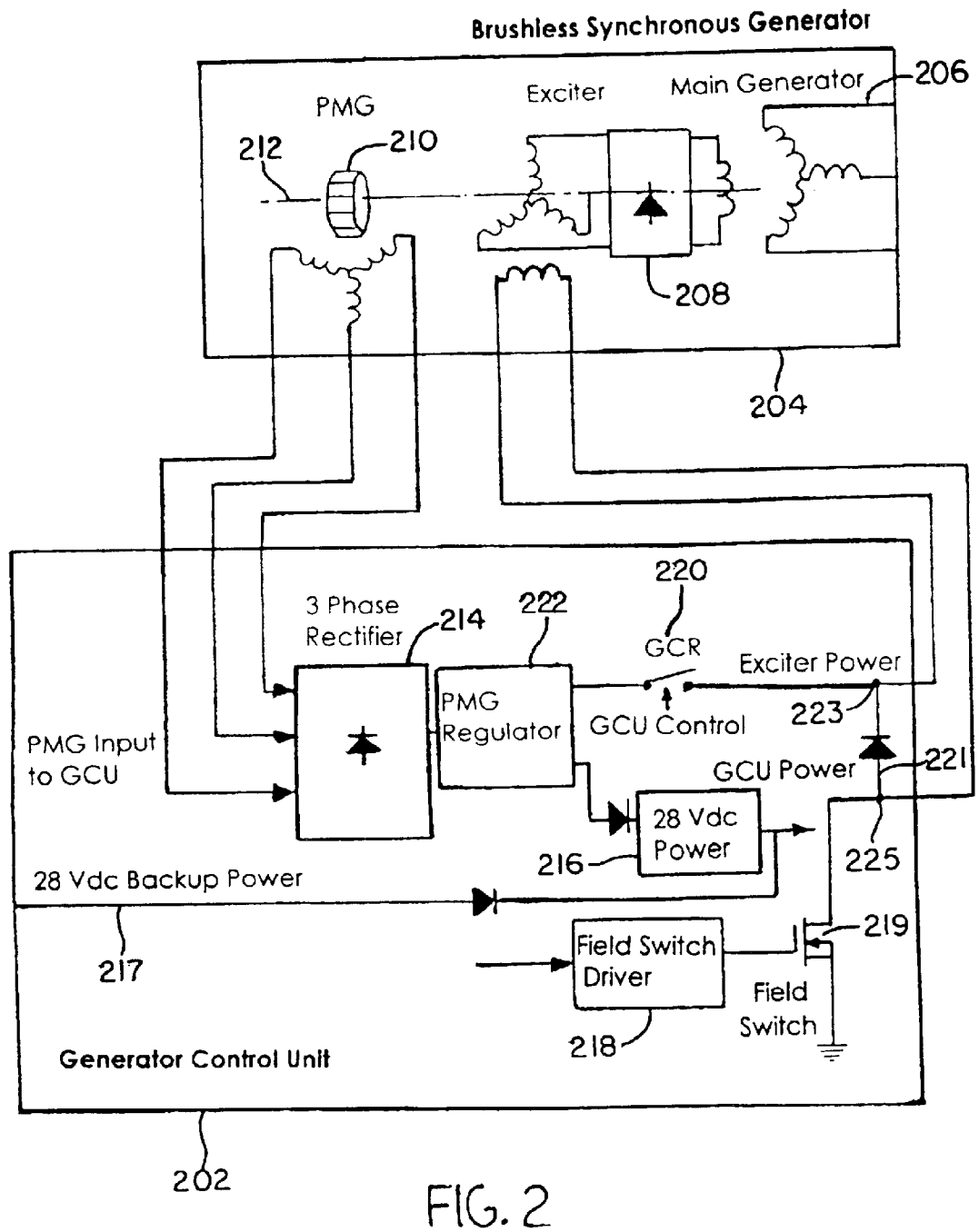
FIG. 2 is a schematic illustration of an exemplary embodiment of a generator control unit for regulating exciter power to a brushless synchronous generator.

FIG. 2 illustrates one exemplary embodiment of the present invention. In FIG. 2, a brushless synchronous generator (BSG) 204 includes a PMG 210, an exciter 208 and a main generator 206 that are connected to a rotating shaft 212.

Also shown in FIG. 2, a generator control unit (GCU) 202 includes a three phase rectifier 214, a PMG voltage regulator 222, a generator control relay (GCR) 220, a GCU power supply 216 with a backup power source 217, a field switch driver 218, a field switch 219 and a free wheeling diode 221 connected between lines 223 and 225. Line 223 connects an output of the PMG regulator 222 to one end of the stator winding of the exciter 208. Line 225 connects the field switch 219 to the other end of the stator winding of the exciter 208. The free wheeling diode 221 modifies exciter power output from the PMG regulator 222 in reference to a field current component output from the field switch 219 and field switch driver 218. When the field switch 219 is ON, the free wheeling diode 221 is reverse biased and is in a blocking state. When the field switch 219 is OFF, the free wheeling diode 221 is forced on and the diode 221 creates a free-wheeling path for excitation energy from the exciter 208 stator coil.

The BSG 204 is connected to the GCU 202 by coupling the PMG 210 of the BSG 204 to the three phase rectifier 214 of the GCU 202 and also coupling the exciter 208 of the BSG 204 to the PMG regulator 222 and the field switch driver 218 of the GCU 202.

In FIG. 2, the rectified PMG voltage is regulated with a DC/DC converter (300 of FIG. 3 discussed later) so that the DC power to the exciter 208 is independent of the generator speed. Therefore, the exciter 208 is powered from a constant voltage source regardless of the generator speed. As a result, the generator voltage can be regulated throughout the entire speed range without complex control compensation. When the generator control relay 220 closes, a connection from the three-phase rectifier 214 is made and exciter power flows to a coil of the exciter 208.

The output voltage level of the PMG regulator 222 is based upon the power requirement of the exciter 208. Although the input voltage to the exciter 208 is constant in this invention, the voltage level still needs to be optimized in order to achieve better system performance. The voltage should be chosen so that the PMG regulator 222 will produce adequate power to the exciter 208 during the worst case of load-added transients at low-end generator speed, and also so that at high-end generator speed the exciter field switching duty-cycle will not be at too low a level for operating at the designated switching frequency. A low exciter input voltage will cause a sluggish transient at low-end generator speed. Further, care should be taken so that at high-end generator speeds, the exciter field switching duty-cycle will not be too low at the selected switching frequency. The worst case scenario is no-load operation at the highest possible operating speed. The exciter input voltage level should be chosen so that the duty-cycle of the generator will be no less than 10% under this condition. A low exciter input voltage will cause a sluggish transient performance at low speed. Too high of an exciter input voltage selected will result in the loss of switching pulses or system instability.

The regulated voltage level of the exciter power supply depends on the generator rating, operation speed range and generator design. For a 150 kVA 12000 rpm–24000 rpm generator, the regulated exciter power can be in the range of 50–80 Vdc, depending on the generator design.

Figure 3:
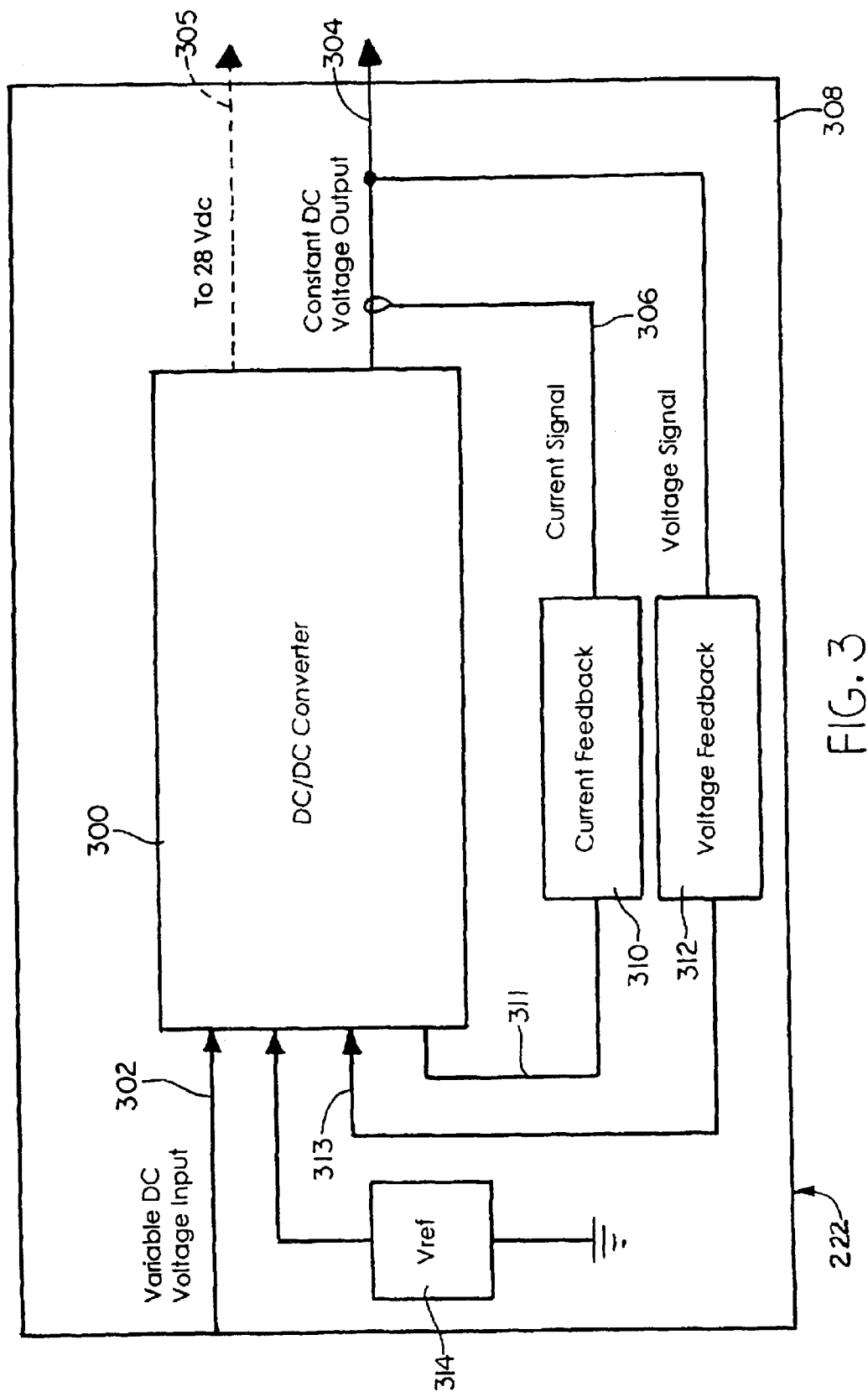
FIG. 3 is a schematic illustration of a PMG voltage regulator according to one implementation of the present invention.

In FIG. 3 a detailed view of the PMG voltage regulator 222 according to an exemplary implementation of the invention is shown. The rectified (variable) PMG voltage 302 is input and regulated with a DC/DC converter 300 so that the DC power to the exciter is independent of generator speed. In one exemplary embodiment of the present invention, the DC/DC converter 300 can be a switching mode converter. A switching mode converter A voltage reference 314 is also input into the DC/DC converter 300. Those skilled in the art will appreciate that there are different types of switching mode converters and converter topologies that can be used to convert unregulated DC voltages to regulated or variable DC voltages at the output. A voltage reference 314 is also input into the DC/DC converter 300.

A current signal 306 from a constant DC voltage output line 304 is output from the DC to DC converter 300 and fed back through a current conditioning circuit 310 and input 311 into the DC/DC converter 300. Additionally, a voltage signal 308 from the constant DC voltage output line 304 is output from the DC to DC converter 300 and fed back through a voltage feedback circuit 312 and input 313 into the DC to DC converter 300.

In FIG. 3, the PMG voltage regulator 222 takes the rectified PMG voltage as input and performs voltage regulation with a switching-mode step-down DC/DC converter 300. The 28 Vdc power supply for GCU internal power can be located inside the PMG regulator block 222 in FIG. 2 if a multi-output transformer is used.

In FIG. 3, the dashed line 305 represents the separate 28 Vdc output tap from the DC/DC converter 300 if a multi-output transformer is used. If there is no multi-output transformer in the DC/DC converter, the 28 Vdc power has to be converted from the main output (solid line) using a separate DC/DC converter.

In FIG. 3, a current conditioning circuit 310 is provided to the current signal 306 returning from the constant DC voltage output line 304 and feeding back 311 into the DC/DC converter.

The output voltage level of the PMG regulator 222 is based upon the power requirement of the exciter 208. The exciter power supply voltage is constant regardless of the generator speed. As a result, the generator can be regulated throughout the entire speed range without complex control compensation.

In implementing the present invention, all primary topologies of a step-down DC/DC converter can be used, but the transformer-isolated type should be considered first, because in a variable frequency (VF) system, the input voltage to the DC/DC converter can be 200–300 Vrms high. Consequently, a failure mode of straight short circuit between input and output circuit can be severe. The use of a transformer isolated design topology will prevent the output circuit and loads of the PMG voltage regulator from damage by the high voltage. Furthermore, a transformer helps achieve a high ratio of input/output voltage in one step, even if the generator speed range is a wide one. A two-stage step-down conversion is required when using a non-transformer isolated converter in some wide range VF systems. Additionally, the above referenced topology facilitates obtaining multi-level voltage outputs from the same converter. The 28 Vdc GCU internal power can be produced from the same converter.

For larger generators and applications, the DC power required by the exciter can be large (e.g., 300 W). In this case, a double-end converter should be preferred because the switch peak current and power loss in individual switches are lower.

As mentioned earlier, FIG. 2 shows a power supply 216. When a power supply supplies power to an exciter, power quality considerations such as ripple and voltage regulation are not critical design parameters. For example, one design choice can be that of using a filter to reduce electromagnetic interference (EMI). Voltage-mode control should provide adequate control for its output voltage.

What is claimed is:

1. A control system including a generator control unit (GCU) for controlling exciter power of a generator and modulating a generator excitation source voltage according to load and speed conditions in a brushless synchronous generator (BSG) having a permanent magnetic generator (PMG), an exciter and a main generator that are connected to a rotating shaft, the GCU comprising:

a rectifier for converting alternating current to direct current;

a voltage regulator for controlling an output voltage level based upon a power requirement of said exciter;

a field switch for maintaining a field current through an exciter stator winding under said load and speed conditions; and a free wheeling diode for modifying exciter power in accordance with a field current component controlled by said field switch;

wherein said BSG is connected to said GCU by coupling said PMG of said BSG to the rectifier of said GCU and by coupling said exciter of said BSG to said voltage regulator and said field switch driver of said GCU, and said voltage regulator receives and regulates the rectified voltage of the PMG.

2. The control system of claim 1 wherein the rectifier is a three phase rectifier.

3. The control system of claim 1 wherein the voltage regulator is a PMG voltage regulator and said PMG voltage regulator further comprises a direct current (DC) to direct current (DC) converter.

4. The control system of claim 3 wherein a variable DC voltage is input into said DC to DC converter and a current signal from a constant DC voltage output line is output from said DC to DC converter and fed back through a current conditioning circuit and then input into said DC to DC converter.

5. The control system of claim 3 wherein a voltage signal from said constant DC voltage output line is output from said DC to DC converter and fed back through a voltage feedback circuit and then input into said DC to DC converter.

6. The control system of claim 3 wherein an output voltage level of the PMG voltage regulator is based on the power requirement of the generator exciter.

7. The control system of claim 3 wherein the PMG voltage regulator receives a rectified PMG voltage as input and performs voltage regulation using a switching-mode step-down DC/DC converter.

8. The control system of claim 3 wherein a rectified PMG voltage is regulated with a DC/DC converter and the DC power applied to said exciter is independent of said generator speed.

9. The control system of claim 8 wherein the DC power applied to said exciter is a constant voltage source.

10. The control system of claim 3 wherein the regulated PMG voltage is independent of generator speed.

11. The control system of claim 3 wherein the DC/DC converter is a transformer isolated DC/DC converter.

12. The control system of claim 3 wherein the DC/DC converter uses two-stage step-down conversion.

13. The control system of claim 3 wherein the DC/DC converter is a double-end converter.

14. The control system of claim 1, wherein said voltage regulator is configured to regulate the rectified PMG by maintaining the output voltage level to be substantially constant over a range of generator speeds.

15. The control system of claim 1, wherein the range of generator speeds is substantially 12000 revolutions per minute (RPM) to 24000 RPM.

* * * * *